US012219140B2

United States Patent
Gao et al.

(10) Patent No.: US 12,219,140 B2
(45) Date of Patent: Feb. 4, 2025

(54) METHOD AND APPARATUS FOR VIDEO CODING FOR MACHINE VISION

(71) Applicant: Tencent America LLC, Palo Alto, CA (US)

(72) Inventors: Wen Gao, West Windsor, NJ (US); Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 131 days.

(21) Appl. No.: 17/950,564

(22) Filed: Sep. 22, 2022

(65) Prior Publication Data

US 2023/0144455 A1 May 11, 2023

Related U.S. Application Data

(60) Provisional application No. 63/277,517, filed on Nov. 9, 2021.

(51) Int. Cl.
*H04N 19/124* (2014.01)
*G06V 10/774* (2022.01)
(Continued)

(52) U.S. Cl.
CPC ......... *H04N 19/124* (2014.11); *G06V 10/774* (2022.01); *H04N 19/132* (2014.11); *H04N 19/91* (2014.11)

(58) Field of Classification Search
None
See application file for complete search history.

(56) References Cited

U.S. PATENT DOCUMENTS

| 2017/0127085 A1 | 5/2017 | Sun et al. |
| 2018/0124425 A1 | 5/2018 | Van Leuven et al. |

(Continued)

FOREIGN PATENT DOCUMENTS

| JP | 2020-191630 A | 11/2020 |
| WO | 2018/199051 A1 | 11/2018 |

OTHER PUBLICATIONS

Tamvakis A, Anagnostopoulos CN, Tsirtsis G, Niros AD, Spatharis S. Optimized classification predictions with a new index combining machine learning algorithms. International Journal on Artificial Intelligence Tools. May 21, 2018;27(03): 1850012. (Year: 2018).*

(Continued)

*Primary Examiner* — Clifford Hilaire
(74) *Attorney, Agent, or Firm* — Sughrue Mion, PLLC

(57) ABSTRACT

A technique for encoding video for machine vision and human/machine hybrid vision, including receiving at a hybrid codec, input including at least one of video or image data, the hybrid codec including a first and second codec wherein the first codec is a traditional codec designed for human consumption and the second codec is a learning-based codec designed for machine vision; compressing the input using the first codec, wherein the compressing includes down-sampling the input using a down-sampling module and up-sampling the compressed input using an up-sampling module producing a residual signal; quantizing the residual signal to obtain a quantized representation of the input; entropy encoding the quantized representation of the input using one or more convolutional filter modules; and training one or more networks using the entropy encoded quantized representation.

16 Claims, 7 Drawing Sheets

(51) Int. Cl.
  *H04N 19/132* (2014.01)
  *H04N 19/91* (2014.01)

(56) References Cited

U.S. PATENT DOCUMENTS

| | | | |
|---|---|---|---|
| 2020/0029084 A1 | 1/2020 | Wierstra et al. | |
| 2020/0304835 A1* | 9/2020 | Liu | H04N 19/91 |
| 2021/0218997 A1* | 7/2021 | Rezazadegan Tavakoli | H04N 19/176 |
| 2021/0314573 A1* | 10/2021 | Zhang | H04N 19/85 |

OTHER PUBLICATIONS

International Search Report dated Feb. 21, 2023 from the International Searching Authority in International Application No. PCT/US2022/045004.

Written Opinion dated Feb. 21, 2023 from the International Searching Authority in International Application No. PCT/US2022/045004.

Guo Lu et al., "DVC: An End-to-end Deep Video Compression Framework", arXiv:1812.00101v3 [eess]IV, Apr. 2019, 14 pages.

Zhengxue Cheng et al., "Learned Image Compression with Discretized Gaussian Mixture Likelihoods and Attention Modules", arXiv:2001.1568v3 [eess.IV] Mar. 2020, 15 pages.

"Use cases and requirements for Video Coding for Machines", ISO/IEC JTC 1/SC 29/WG 2, MPEG Technical requirements, Convenorship: SFS (Finland), Oct. 2020, 21 pages.

"Draft of Evaluation Framework for Video Coding for Machines", ISO/IEC JTC 1/SC 29/WG 2 N19, MPEG Technical requirements, Convenorship: SFS (Finland), Oct. 2020, 50 pages.

"Draft of Call for Evidence for Video Coding for Machines", ISO/IEC JTC 1/SC 29/WG 2 N20, MPEG Technical requirements, Convenorship: SFS (Finland), Oct. 2020, 12 pages.

Zhou Wang et al., "Multi-Scale Structural Similarity for Image Quality Assessment", Proceedings of the 37th IEEE Asilomar Conference on Signals, Systems and Computers, 2003, 5 pages.

Johannes Balle et al., "Variational Image Compression With a Scale Hyperprior", a conference paper at ICLR 2018, arXiv:1802.01436v2 [eess.IV], May 2018, 23 pages.

\* cited by examiner

METHOD AND APPARATUS FOR VIDEO CODING FOR MACHINE VISION

CROSS REFERENCE TO RELATED APPLICATIONS

This application claims priority under 35 U.S.C. § 119 from U.S. Provisional Application No. 63/277,517 filed on Nov. 9, 2021 in the U.S. Patent & Trademark Office, the disclosure of which is incorporated herein by reference in its entirety.

TECHNICAL FIELD

The present disclosure relates to video coding for machine vision. Specifically, approaches to encoding video for machine vision and human/machine hybrid vision are disclosed.

BACKGROUND

Traditionally, video or images are consumed by a human being for a variety of usages such as entertainment, education, etc. Thus, video coding or image coding often utilize characteristics of the human visual system for better compression efficiency, while maintaining good subjective quality.

In recent years, with the rise of machine learning applications, along with the abundance of sensors, many intelligent platforms have utilized video for machine vision tasks such as object detection, segmentation or tracking. How to encode video or images for consumption by machine tasks becomes an interesting and challenging problem, leading to the introduction of Video Coding for Machines (VCM) studies. To achieve this goal, the international standard group MPEG created an Ad-Hoc group, "Video coding for machine (VCM)" to standardize the related techniques for better interoperability among difference devices.

Existing video codecs are mainly for human consumption. However, more and more video is consumed by machine for machine vision tasks such as object detection, instance segmentation, object tracking, etc. It is important to develop a video codec that efficiently encodes video for machine vision or hybrid machine/human vision.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable mediums on encoding video for machine vision and human/machine hybrid vision.

According to an exemplary embodiment, a method for encoding video for machine vision and human/machine hybrid vision performed by one or more processors. The method includes receiving at a hybrid codec, input including at least one of video or image data, the hybrid codec including a first and second codec, wherein the first codec is a traditional codec designed for human consumption and the second codec is a learning-based codec designed for machine vision. The method further includes compressing the input using the first codec, wherein the compressing includes down-sampling the input using a down-sampling module and up-sampling the compressed input using an up-sampling module producing a residual signal. The method further includes quantizing the residual signal to obtain a quantized representation of the input. The method further includes entropy encoding the quantized representation of the input using one or more convolutional filter modules; and training one or more networks using the entropy encoded quantized representation.

According to an exemplary embodiment, an apparatus for encoding video for machine vision and human/machine hybrid vision includes at least one memory configured to store computer program code and at least one processor configured to access the computer program code and operate as instructed by the computer program code. The computer program code includes setting code configured to cause the at least one processor to receive at a hybrid codec, input including at least one of video or image data, the hybrid codec including a first and second codec, wherein the first codec is a traditional codec designed for human consumption and the second codec is a learning-based codec designed for machine vision. The computer program code further includes compressing code configured to cause the at least one processor to compress the input using the first codec, wherein the compressing code includes down-sampling code configured to cause the at least one processor to down-sample the input using a down-sampling module, and the compressing code includes up-sampling code configured to cause the at least one processor to up-sample the compressed input using an up-sampling module producing a residual signal. The computer program code further includes quantizing code configured to cause the at least one processor to quantize the residual signal to obtain a quantized representation of the input. The computer program code further includes entropy encoding code configured to cause the at least one processor to encode the quantized representation of the input using one or more convolutional filter modules. The computer program code further includes training code configured to cause the one or more networks using the entropy encoded quantized representation.

According to an exemplary embodiment, a non-transitory computer readable medium having instructions stored therein, which when executed by a processor cause the processor to execute a method for encoding video for machine vision and human/machine hybrid vision. The method includes receiving at a hybrid codec, input including at least one of video or image data, the hybrid codec including a first and second codec, wherein the first codec is a traditional codec designed for human consumption and the second codec is a learning-based codec designed for machine vision. The method further includes compressing the input using the first codec, wherein the compressing includes down-sampling the input using a down-sampling module and up-sampling the compressed input using an up-sampling module producing a residual signal. The method further includes quantizing the residual signal to obtain a quantized representation of the input. The method further includes entropy encoding the quantized representation of the input using one or more convolutional filter modules; and training one or more networks using the entropy encoded quantized representation.

Additional embodiments will be set forth in the description that follows and, in part, will be apparent from the description, and/or may be learned by practice of the presented embodiments of the disclosure.

BRIEF DESCRIPTION OF THE DRAWINGS

The above and other features and aspects of embodiments of the disclosure will be apparent from the following description taken in conjunction with the accompanying drawings, in which.

DETAILED DESCRIPTION

Figure 1:
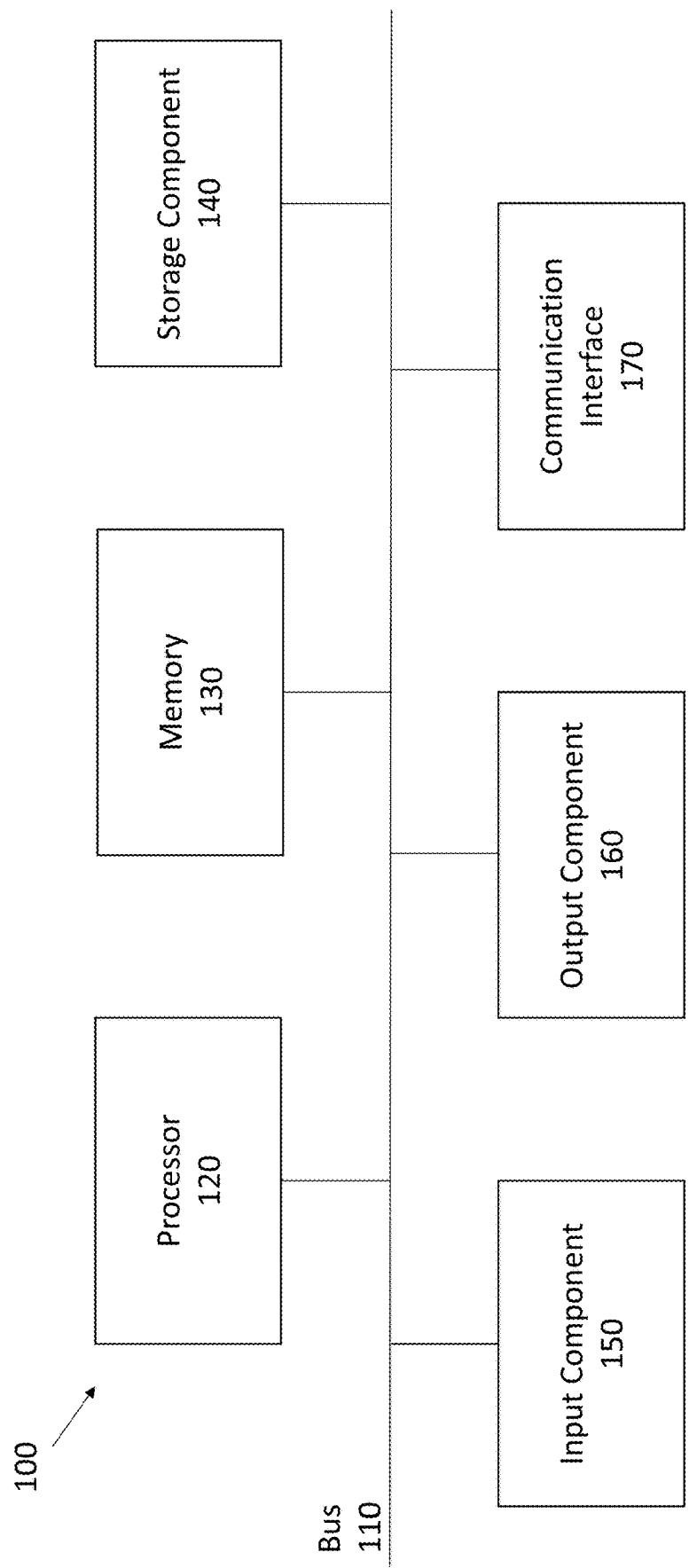
FIG. 1 is a diagram of an example network device, in accordance with various embodiments of the present disclosure.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of some embodiments some embodiments may be incorporated into or combined with some embodiments (or one or more features of some embodiments). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "some embodiments," "an embodiment," or similar language means that a particular feature, structure, or characteristic described in connection with the indicated embodiment is included in some embodiments of the present solution. Thus, the phrases "in some embodiments", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

The disclosed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

Embodiments of the present disclosure are directed to a video coding for machine. Specifically, methods of encoding video for machine vision and human/machine hybrid vision are disclosed. Traditional video codecs are designed for human consumption. In some embodiments, a traditional video codec may be combined with a learning-based codec to form a hybrid codec such that the video may be coded efficiently for machine vision and hybrid human-and-machine vision.

FIG. 1 is a diagram of an example device for performing translation services. Device 100 may correspond to any type of known computer, server, or data processing device. For example, the device 100 may comprise a processor, a personal computer (PC), a printed circuit board (PCB) comprising a computing device, a mini-computer, a mainframe computer, a microcomputer, a telephonic computing device, a wired/wireless computing device (e.g., a smartphone, a personal digital assistant (PDA)), a laptop, a tablet, a smart device, or any other similar operating device.

In some embodiments, as shown in FIG. 1, the device 100 may include a set of components, such as a processor 120, a memory 130, a storage component 140, an input component 150, an output component 160, and a communication interface 170.

The bus 110 may comprise one or more components that permit communication among the set of components of the device 100. For example, the bus 110 may be a communication bus, a cross-over bar, a network, or the like. Although the bus 110 is depicted as a single line in FIG. 1, the bus 110 may be implemented using multiple (two or more) connections between the set of components of device 100. The disclosure is not limited in this regard.

The device 100 may comprise one or more processors, such as the processor 120. The processor 120 may be implemented in hardware, firmware, and/or a combination of hardware and software. For example, the processor 120 may comprise a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a general purpose single-chip or multi-chip processor, or other programmable logic device, discrete gate or transistor logic, discrete hardware components, or any combination thereof designed to perform the operations described herein. A general purpose processor may be a microprocessor, or any conventional processor, controller, microcontroller, or state machine. The processor 120 also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given operation.

The processor 120 may control overall operation of the device 100 and/or of the set of components of device 100 (e.g., the memory 130, the storage component 140, the input component 150, the output component 160, and the communication interface 170).

The device 100 may further comprise the memory 130. In some embodiments, the memory 130 may comprise a random access memory (RAM), a read only memory (ROM), an electrically erasable programmable ROM (EEPROM), a flash memory, a magnetic memory, an optical memory, and/or another type of dynamic or static storage device. The memory 130 may store information and/or instructions for use (e.g., execution) by the processor 120.

The storage component 140 of device 100 may store information and/or computer-readable instructions and/or code related to the operation and use of the device 100. For example, the storage component 140 may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

The device 100 may further comprise the input component 150. The input component 150 may include one or more components that permit the device 100 to receive information, such as via user input (e.g., a touch screen, a keyboard, a keypad, a mouse, a stylus, a button, a switch, a microphone, a camera, and the like). Alternatively or additionally, the input component 150 may include a sensor for sensing information (e.g., a global positioning system (GPS) component, an accelerometer, a gyroscope, an actuator, and the like).

The output component 160 of device 100 may include one or more components that may provide output information from the device 100 (e.g., a display, a liquid crystal display (LCD), light-emitting diodes (LEDs), organic light emitting diodes (OLEDs), a haptic feedback device, a speaker, and the like).

The device 100 may further comprise the communication interface 170. The communication interface 170 may include a receiver component, a transmitter component, and/or a transceiver component. The communication interface 170 may enable the device 100 to establish connections and/or transfer communications with other devices (e.g., a server, another device). The communications may be effected via a wired connection, a wireless connection, or a combination of wired and wireless connections. The communication interface 170 may permit the device 100 to receive information from another device and/or provide information to another device. In some embodiments, the communication interface 170 may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface 170 may provide for communications with another device via a device-to-device (D2D) communication link, such as FlashLinQ, WiMedia, Bluetooth, ZigBee, Wi-Fi, LTE, 5G, and the like. In other embodiments, the communication interface 170 may include an Ethernet interface, an optical interface, a coaxial interface, an infrared interface, a radio frequency (RF) interface, or the like.

The device 100 may be included in the core network 240 and perform one or more processes described herein. The device 100 may perform operations based on the processor 120 executing computer-readable instructions and/or code that may be stored by a non-transitory computer-readable medium, such as the memory 130 and/or the storage component 140. A computer-readable medium may refer to a non-transitory memory device. A memory device may include memory space within a single physical storage device and/or memory space spread across multiple physical storage devices.

Computer-readable instructions and/or code may be read into the memory 130 and/or the storage component 140 from another computer-readable medium or from another device via the communication interface 170. The computer-readable instructions and/or code stored in the memory 130 and/or storage component 140, if or when executed by the processor 120, may cause the device 100 to perform one or more processes described herein.

Alternatively or additionally, hardwired circuitry may be used in place of or in combination with software instructions to perform one or more processes described herein. Thus, embodiments described herein are not limited to any specific combination of hardware circuitry and software.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally or alternatively, a set of (one or more) components shown in FIG. 1 may perform one or more operations described as being performed by another set of components shown in FIG. 1.

Figure 2:
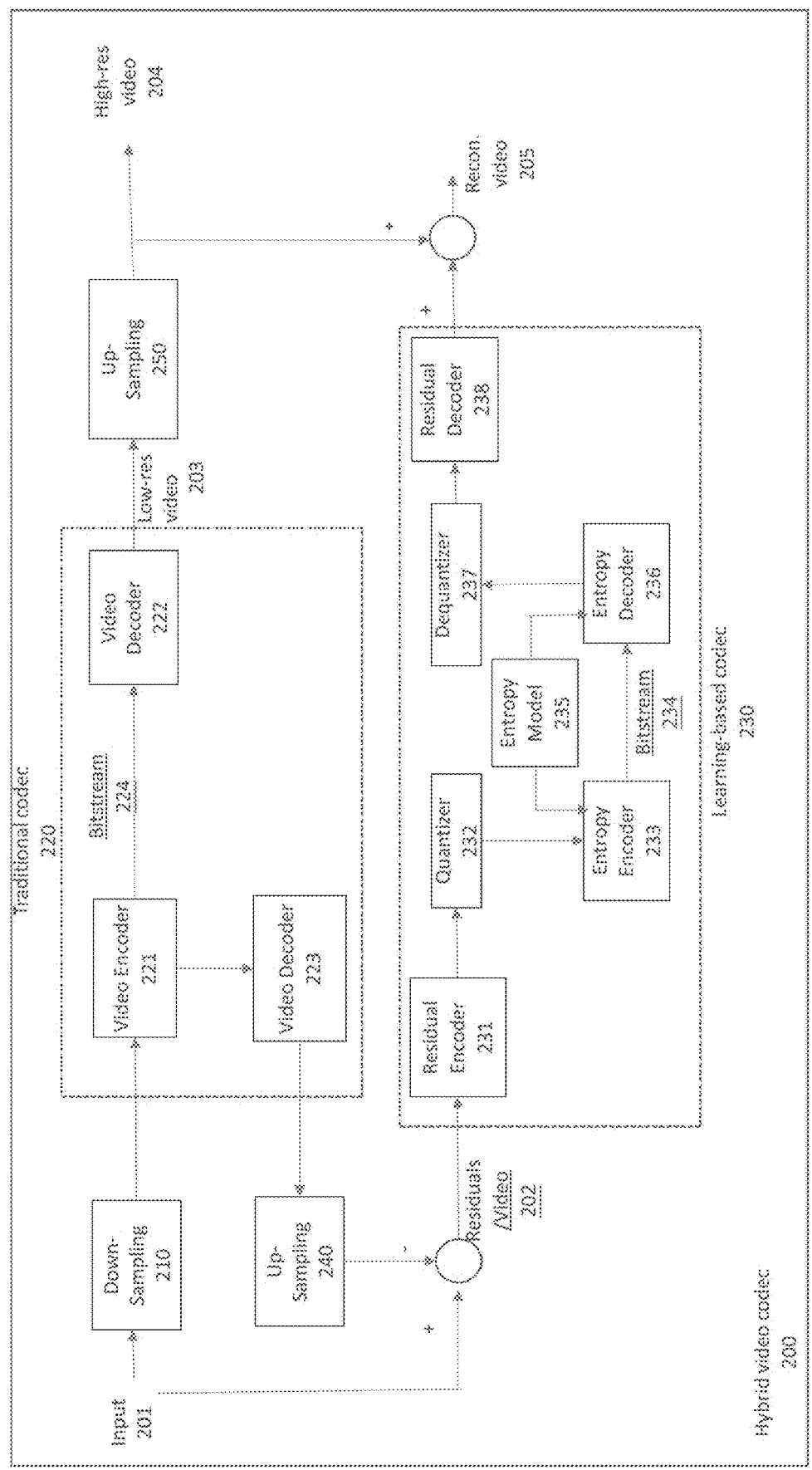
FIG. 2 shows the architecture of the disclosed hybrid video codec, according to an embodiment of the present disclosure.

FIG. 2 is block diagram of a view of an embodiment of the hybrid video codec 200. The hybrid video code 200 may include a traditional codec 220 and learning-based codec 230. The input 201 to the hybrid codec may be videos or images since images may be treated as a special type of video (e.g., a video with one image). In FIG. 2, a traditional video codec 220 may be used to compress an input video 201 of different scales (e.g., original resolution or down-sampled), the down-sampling ratio of down-sampling module 210 may be fixed and known in both the encoder 221 and the decoder 223, or the down-sampling ratio may be user-defined, for example, 100% (e.g., no down-sampling is performed), 50%, 25%, etc., and sent as meta data in the bitstreams 224 to inform the decoder 222. The traditional video codec may be VVC, HEVC, H264 or image codec such as JPEG, JPEG2000. The down-sampling module 210 may be a classical image down-sampler or a learning-based image down-sampler. The decoded down-sampled video 203 (e.g., "low-res video 203" in FIG. 2) may be up-sampled using up-sampling module 250 to the video's original resolution (e.g., "high-res video 204"), which may be used for human vision. The up-sampling module 250 may be a classical image up-sampler or learning-based image up-sampler such as a learning-based super-resolution module.

In some embodiments, the hybrid video codec 200 may also employ a learning-based video codec 230 to compress the down-sampled video 202.

In the encoder, the reconstructed video 203 may also be generated and up-sampled to the original input resolution. The up-sampled reconstructed video 205 may then be subtracted from the input video to generate residual video signals 202, which may be fed into the learning-based codec 230 of FIG. 2. The up-sampling module 240 of hybrid video codec 200 may be the same as Up-Sampling Module 250 (after low-res). Video 203 may be decoded at the decoder. The output of the residual decoder 238 may be added on top of the high-res video 204 to form the reconstructed video 205, which may be used for machine vision tasks.

The networks in FIG. 4 and FIG. 5, discussed in further detail below, may be trained using images. The disclosed network, such as the one in FIG. 6, needs to be retrained using the residual signal 202 as shown in FIG. 2.

During the training, the input to the learning-based codec 230 may be the residual signal/images 202, which is also the ground-truth. The loss function may utilize the rate distortion loss as follows:

$$L_{overall} = R + \lambda_{mse} L_{mse} \quad (1)$$

In Equation 1, R represents the bitstream cost, which may be an estimated bits per pixel (BPP) value, $L_{mse}$ is the mean squared error between the residual images 202 and the corresponding reconstructed residual images 205, as shown in FIG. 2. $\lambda_{mse}$ is a positive weight factor used to trade-off bit rate cost with the compression performance. In some embodiments, the rate distortion loss may be modified as follows:

$$L_{overall} = R + \lambda_{ms\text{-}ssim} L_{ms\text{-}ssim} \quad (2)$$

where $L_{ms\text{-}ssim}$ is the MS-SSIM metric computed using the residual images 202 and the corresponding reconstructed residual images 205 and $\lambda_{ms\text{-}ssim}$ is the weight factor.

In some embodiments, the task network may be used in the joint training process. A machine vision task network, such the object detection network YOLOv3, or Faster R-CNN, etc., may be added for joint training. The high-res video 204 of FIG. 2 may be the up-sampled decoded video. $L_{detect}$ is the detection loss computed in the object detection network. The overall loss function may be expressed as in Equation 3 or 4:

$$L_{overall} = R + \lambda_{mse} L_{mse} \lambda_{detect} L_{detect} \quad (3)$$

$$L_{overall} = R \lambda_{ms\text{-}ssim} L_{ms\text{-}ssim} + \lambda_{detect} L_{detect} \quad (4)$$

where $\lambda_{detect}$ is a positive weight factor. During the training, the model parameters for the machine vision network may be fixed and only the parameters for the residual encoder 231/decoder 238, entropy encoder 233/decoder 236 and entropy model 235 are trained. In some embodiments, the parameters for the machine vision network may be trained together with the rest of networks in FIG. 2.

Figure 3:
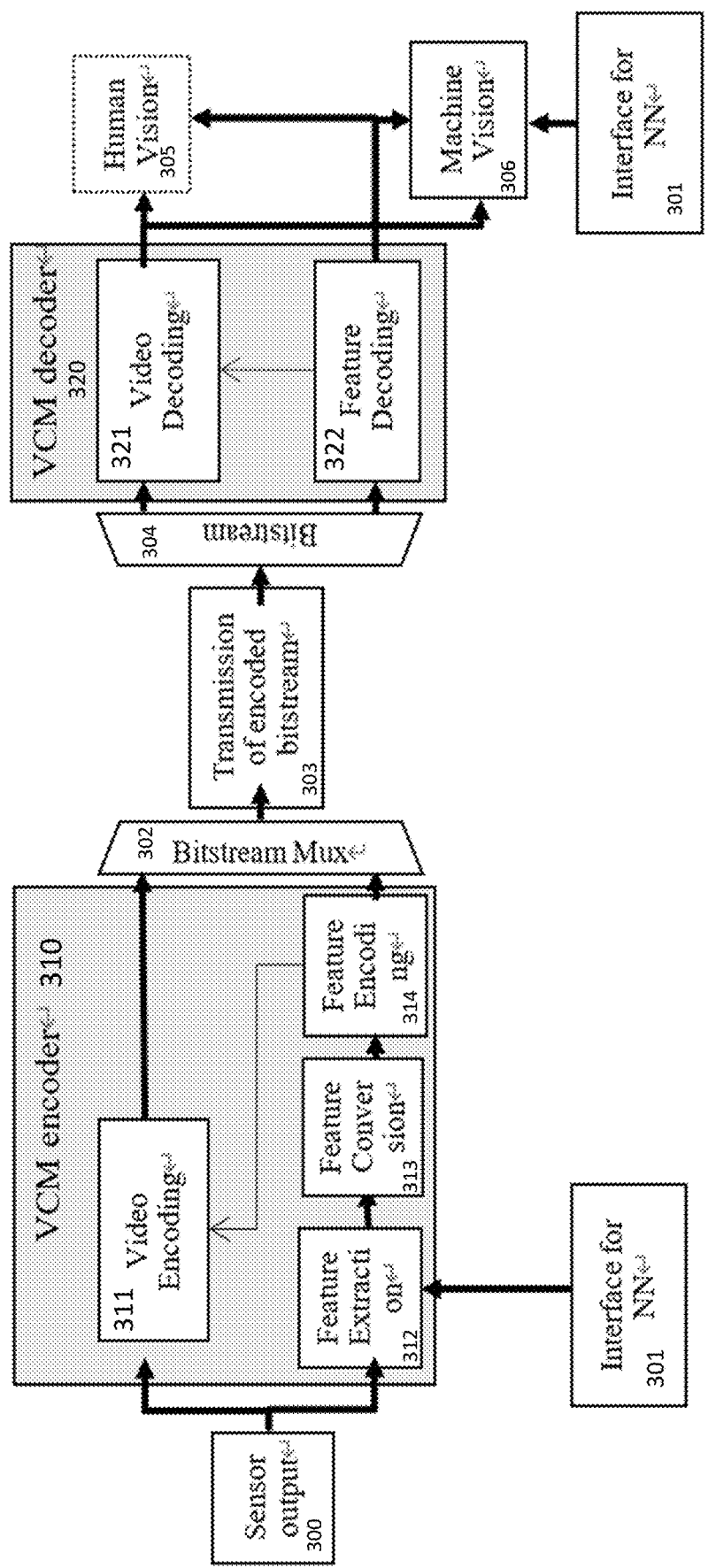
FIG. 3 is a video coding for machine system, in accordance with various embodiments of the present disclosure.

FIG. 3 illustrates embodiment of an architecture for a Video Coding Machine (VCM) such as hybrid video codec 200. Sensor output 300 follows a video encoding path 311 through VCM encoder 310 to VCM decoder 320 where it undergoes video decoding 321. Another path is for feature extraction 312, to feature conversion 313, to feature encoding 314 and feature decoding 322. The output of VCM decoder 320 is mainly for machine consumption, i.e. machine vision 305. In some cases, it can also be used for human vision 306. Then one or more machine tasks to understand the video content will be performed.

Figure 4:
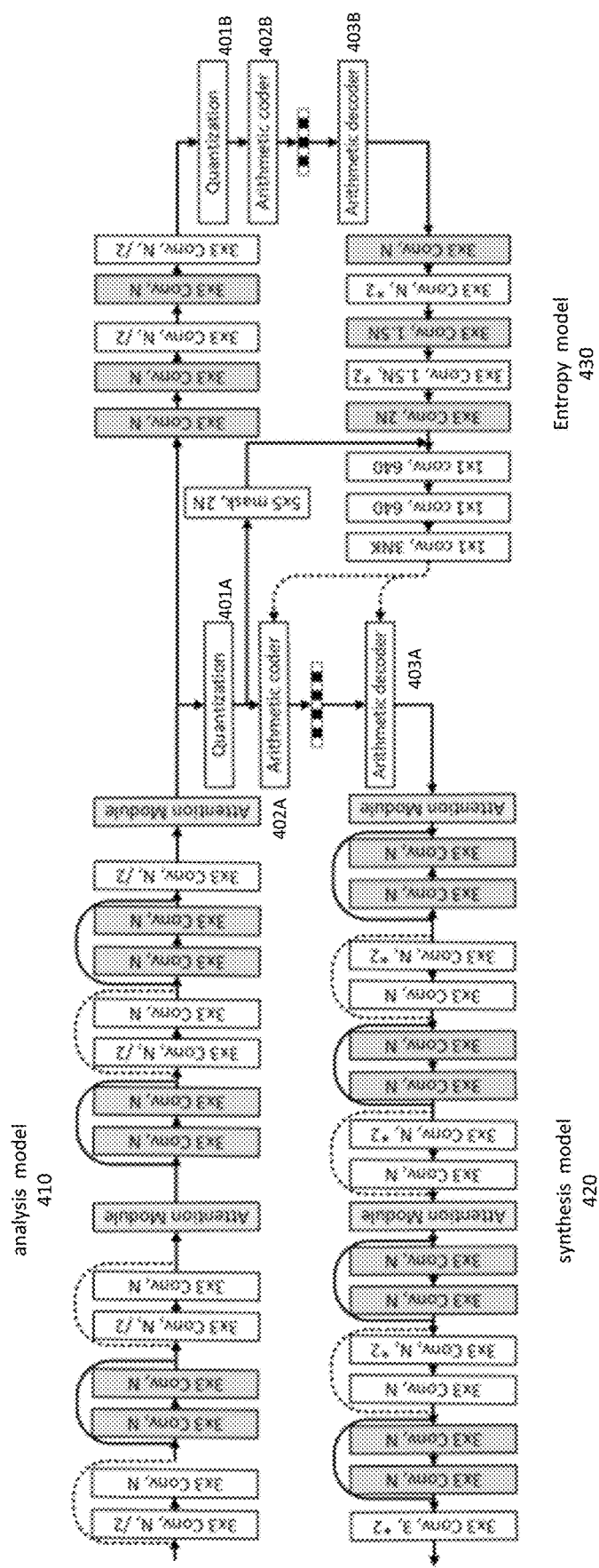
FIG. 4 is a diagram of the architecture of a learning-based image codec, in accordance with various embodiments of the present disclosure.
Figure 5:
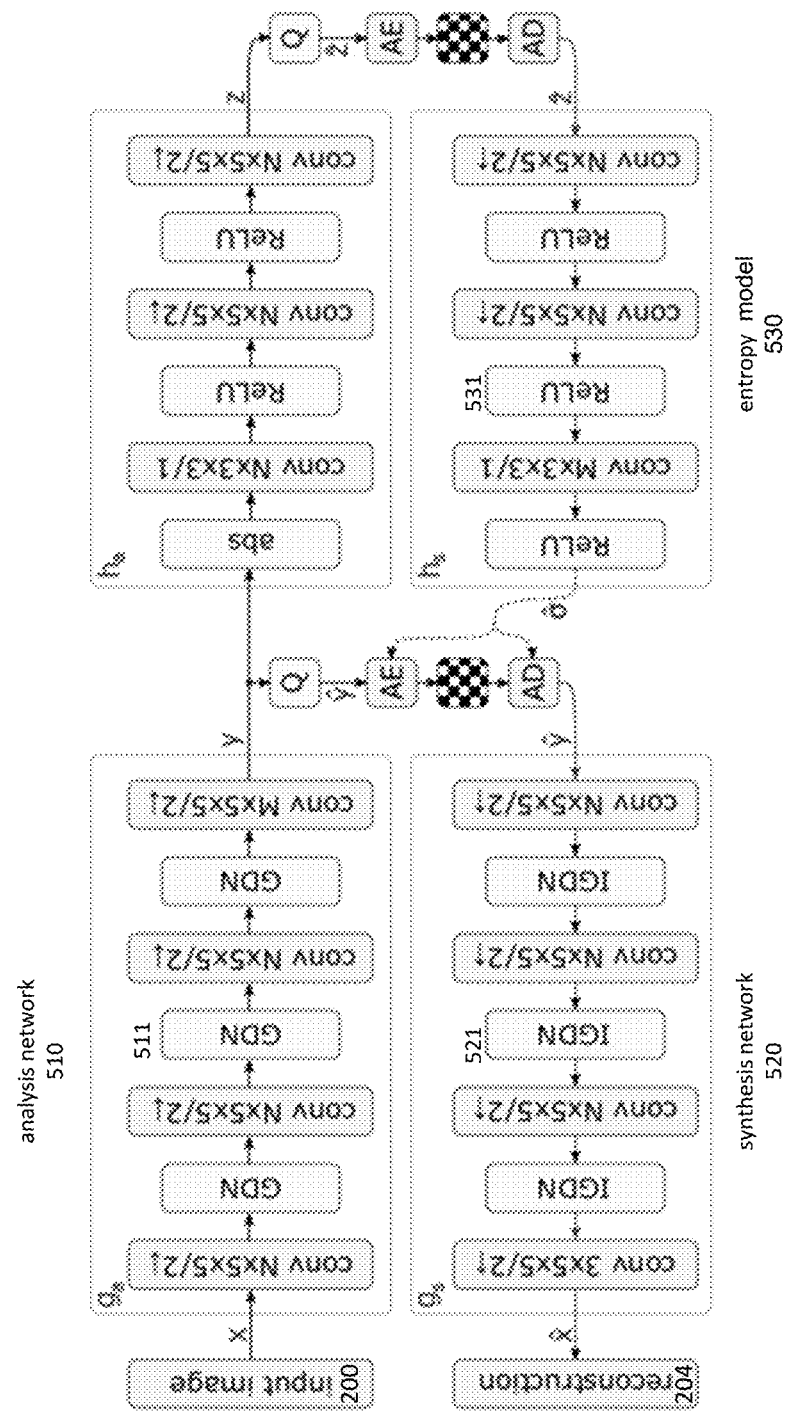
FIG. 5 is a diagram of the architecture of a learning-based image codec, in accordance with various embodiments of the present disclosure.

FIG. 4 and FIG. 5. illustrates the architecture of the learning-based image codec 230 in some embodiments. The learning-based codec 230 may be an image codec so that the residual video signal in the above section may be compressed frame by frame without consideration of the temporal redundancy among the frames. For examples, the learning-based image codec 230 can follow the auto-encoder architecture as shown in FIG. 4 and FIG. 5. In some examples, the dequantization module may be removed since the quantization operations 401A and 401B are rounding operations (e.g., round a floating number to its neighboring integer). The corresponding dequantization module 237 may be an identity module and may be removed from the architecture. Thus, the dequantizer module 237 in FIG. 2. may be removed, depending the operation of the quantization module 232.

The two architectures of FIG. 4 and FIG. 5 are similar auto-encoder architectures. FIG. 4 illustrates an example architecture including analysis network 410, synthesis network 420, quantization 401A, 401B, arithmetic coder 402A, 402B and decoder 403A, 403B, and entropy model 430. The difference lies in the details of analysis network 410, the synthesis network 420, and the entropy model 430.

In addition, the networks may be designed for compression of regular images. Thus, the number of filters in each convolution module may be larger. For example, in FIG. 2, N=128 and M=192 or 320. Similarly, in FIG. 3, N=192. Since, in FIG. 2 the learning-based image codec 230 may be used to compress the residual signal 202, the number of filters in the convolutional filter modules may be reduced significantly for complexity reduction with minor the performance degradation; the GDN (generalized divisive normalization) module 511 and IGDN (inverse generalization divisive normalization) module 521 may be replaced with ReLU 531 (Rectified Linear Unit) in FIG. 5; the attention module in FIG. 4 may be removed for complexity reduction; the Gauss mixture entropy model may be replaced with the scale hyper priori module shown in FIG. 2.

Figure 7:
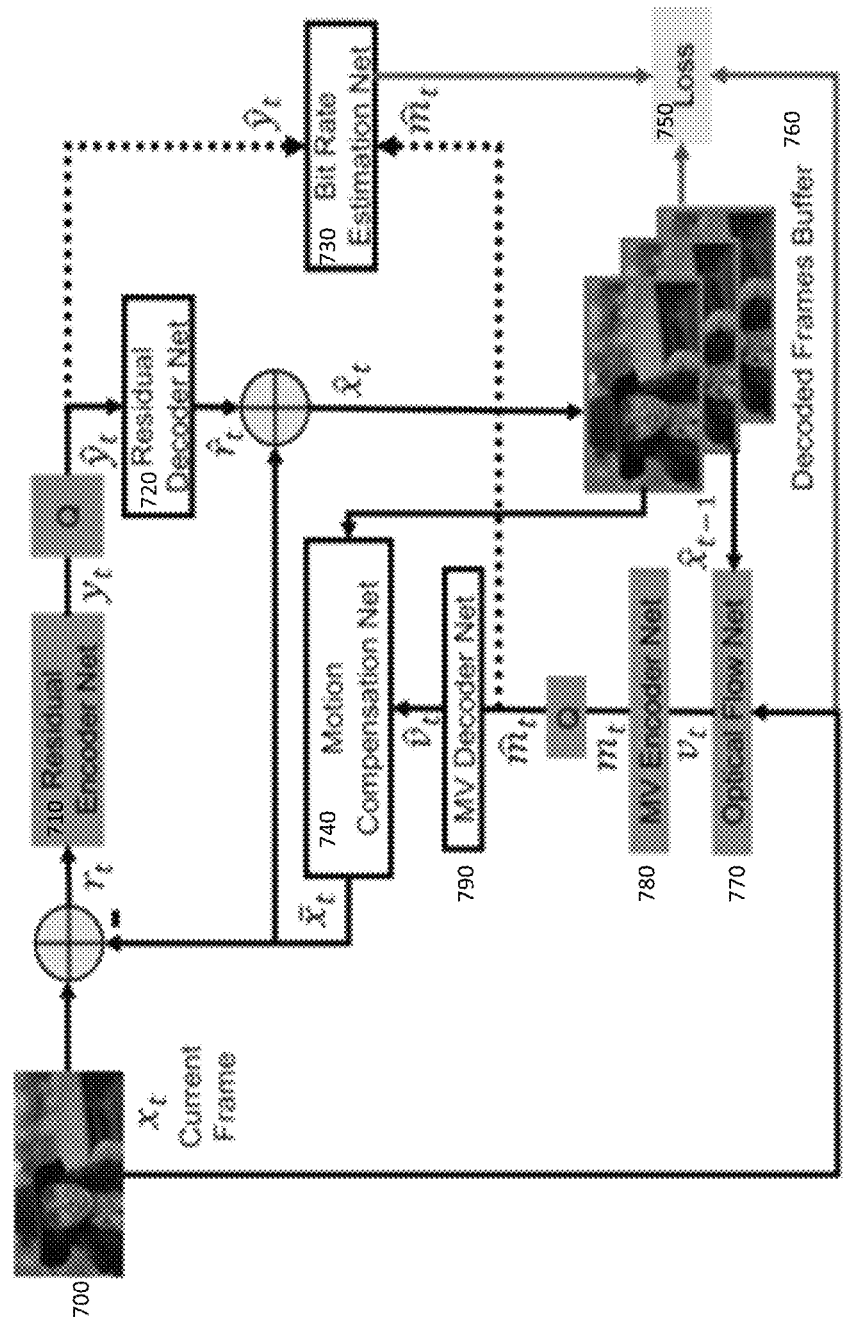
FIG. 7 is an example of learning-based video codec, in accordance with various embodiments of the present disclosure.

In the present disclosure, the architectures in FIG. 4 and FIG. 5 are used as an example, any auto-encoder following the spirit of FIG. 4 or FIG. 5 or their reduced complexity version may be utilized. For example, one example of such architecture is shown in FIG. 2 In some embodiments, the learning-based codec 230 may be a video codec so that the temporal redundancy among frames in the residual signals 202 may be exploited. An example of learning-based video codec 230 is shown in FIG. 7.

Figure 6:
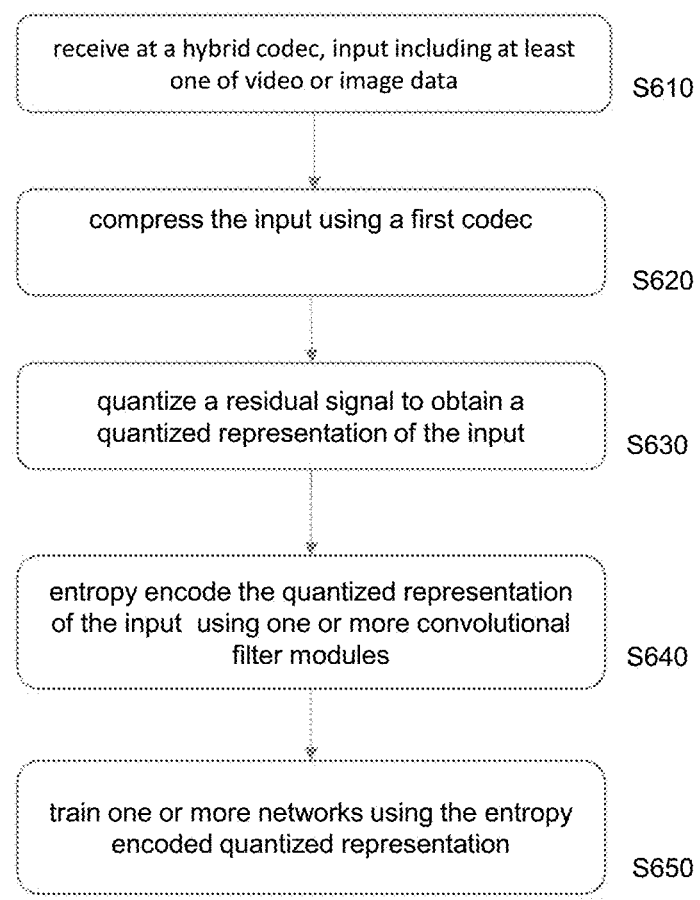
FIG. 6 is a flow chart of an example process for training one or more networks of the hybrid video codec, in accordance with various embodiments of the present disclosure.

FIG. 6 illustrates a flow chart that discloses an embodiment of a process to train one or more networks. The process may start at operation S610 where an input including at least one video or image is received at a hybrid codec. The hybrid codec may include a first and second codec, where the first codec is a traditional codec designed for human consumption, and the second codec is a learning-based codec designed for machine vision. As an example, the hybrid codec may be a hybrid video codec 200 comprising a first and second codec. The first codec may be a traditional codec 220, and the second codec may be a learning-based codec 230 that receives an input 201 as seen in FIG. 2. The process proceeds to operation S620 where the input is compressed using the first codec. For example, the input 201 may be compressed by the first code 220. The compressing may include down-sampling the input using a down-sampling module 210 and up-sampling the compressed input using an up-sampling module 240 producing a residual signal 202. The process proceeds to operation S630 where the residual signal (e.g., residual signal 202) is quantized to obtain a quantized representation of the input using a quantizer such as quantizer 232. The process proceeds to operation S640 where the quantized representation of the input is entropy encoded using one or more convolutional filter modules of an entropy model such as entropy model 235. The process proceeds to operation S650 where one or more networks are trained using the entropy encoded quantized representation of the input and a reconstructed video such as reconstructed video 205.

To specify the hybrid video codec 200, several parameters need to be specified through high level syntax, such as sequence parameters set, picture parameter set, picture header, etc. Or such information may be delivered via metadata through system level or using SEI messages.

Down-sampling ratio: A set of down-sampling ratio may be defined, say $\{r_0, r_1, \ldots, r_{N-1}\}$ where N is the number down-sampling ratio. Given the height and width of an input image resolution as W, H and the down-sampling ration as $r_n$, the height and width of the down-sampled image are $r_n W$ and $r_n H$, respectively. An index $n \in \{0, 1, \ldots, N-1\}$ is specified to indicate the sampling rate $r_p$ is used in the hybrid video codec. The decoder need use the up-sampling ratio $$\frac{1}{r_p}$$

to up-sample the decoded low-resolution images/video to obtain high resolution images/video. The index n may be binarized using a fix-length code or a p-th order exponential Golomb code and sent in the bitstream with bypass coding. In some embodiments, p=0 or 1.

Up-sampling module (up-sampler): If only one type of up-sampler is used in hybrid video codec, there is no need to specify the up-sampler in the bitstream. However, if multiple types of up-samplers may be employed in the codec, each with different complexity and performance, the information about the type of up-sampler needs to be specified in the bitstream. For example, if there are M types of up-samplers, an index $m \in \{0, 1, \ldots, M-1\}$ is used to specify which type of up-sampler is used. The index m may be binarized using a fix-length code or a p-th order exponential Golomb code and sent in the bitstream with bypass coding. In some embodiments, p=0 or 1.

Codec for coding the down-sampled images/video: If only one type of codec is used in hybrid video code for coding the down-sampled images/video, there is no need to specify the codec in the bitstream. However, if multiple types of codec may be employed in the system, for example, VVC, HEVC, H264, etc., the information about the type of the codec needs to be specified in the bitstream to allow proper decoding in the decoder. For example, if there are Q types of up-samplers, an index $q \in \{0, 1, \ldots Q-1\}$ is used to specify which type of codec is used. The index q may be binarized using a fix-length code or a p-th order exponential Golomb code and sent in the bitstream with bypass coding. In some embodiments, p=0 or 1.

Codec for coding the residual images/video: Similarly, if only one type of learning-based codec is used in hybrid video codec for coding the residual images/video, there is no need to specify the codec in the bitstream. However, if multiple types of codec may be employed in the system, for example, the codecs show in FIG. 2-4, the information about the type of the codec needs to be specified in the bitstream to allow proper decoding in the decoder. For example, if there are L types of codec, an index $l \in \{0, 1, \ldots L-1\}$ may be used to specify which type of codec is used. The index 1 may be binarized using a fix-length code or a p-th order exponential Golomb code and sent in the bitstream with bypass coding. In some embodiments, p=0 or 1. The different types of codec should be known by both encoder and decoder.

In some embodiments, instead of using an index, a description about the network structure of the learning-based codec can specified in the high-level syntax or meta data. For example, we can specify the individual module in the decoder network, such as 3×3 convolution module with N output filters, 3×3 convolution module with N output filters with 2× up-sampling, etc., Besides the network structure, the corresponding decoder model parameters may be sent in the bitstream to allow the decoder to decode the bitstream and generate the reconstructed residual images/video. The decoder network does have be symmetric with the encoder network. Partial reconstruction of the residual images/video are possible. In addition, instead of floating-point implementation of the learning-based codec, a fixed-point implementation may be specified.

Parameter set selection for different machine tasks: In some embodiments, for the residue video signal coding branch, different parameter sets may be trained for different machine vision tasks while the same network architecture is shared by different tasks. To perform the residue coding for one specific video input, the target machine task should be specified, if there is more than 1 task this framework is to support. For example, if there are T types of machine vision tasks, an index $t \in \{0, 1, \ldots T-1\}$ may be used to specify which type of machine tasks is targeted. The residue signal coding branch will therefore switch to the corresponding parameter set that is trained for that task.

Quantization: Quantization generally refers to dividing data with a continuous variation into finite levels of division and assigning a specific value to each level. The most basic form of quantization is uniform quantization. Uniform quantization is a method of having a quantizing interval of the same size within a certain range. For example, there is a method of setting the size of the quantizing interval by dividing the minimum and maximum values for specific input data by quantization bits desired to be quantized.

The foregoing disclosure provides illustration and description, but is not intended to be exhaustive or to limit the implementations to the precise form disclosed. Modifications and variations are possible in light of the above disclosure or may be acquired from practice of the implementations.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the operations specified in the flowchart and/or block diagram block or blocks. These computer readable program instructions may also be stored in a computer readable storage medium that can direct a computer, a programmable data processing apparatus, and/or other devices to operate in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the operations specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical operation(s). The method, computer system, and computer readable medium may include additional blocks, fewer blocks, different blocks, or differently arranged blocks than those depicted in the Figures. In some alternative implementations, the operations in the blocks may occur out of the order in the Figures. For example, two blocks shown in succession may, in fact, be executed concurrently or substantially concurrently, or the blocks may sometimes be executed in the reverse order, depending upon the functionality involved Each block of the block diagrams and/or flowchart illustration, and combinations of blocks in the block diagrams and/or flowchart illustration, may be implemented by special purpose hardware-based systems that perform the specified operations or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

The above disclosure also encompasses the embodiments listed below:

(1) A method for encoding video for machine vision and human/machine hybrid vision, the method being executed by one or more processors, the method including: receiving at a hybrid codec, input including at least one of video or image data, the hybrid codec including a first and second codec, wherein the first codec is a traditional codec designed for human consumption and the second codec is a learning-based codec designed for machine vision; compressing the input using the first codec, wherein the compressing includes down-sampling the input using a down-sampling module and up-sampling the compressed input using an up-sampling module producing a residual signal; quantizing the residual signal to obtain a quantized representation of the input; entropy encoding the quantized representation of the input using one or more convolutional filter modules; and training one or more networks using the entropy encoded quantized representation.

(2) The method of feature (1), in which the traditional codec comprises any of a VVC, HEVC, H264, JPEG, or JPEG2000 codec.

(3) The method according to feature (1) or (2), in which the learning codec comprises an image codec, and wherein the residual signal is compressed frame by frame without consideration of the temporal redundancy.

(4) The method according to any one of features (1)-(3), in which the down-sampling module is one of a classical image down-sampler and a learning-based image down-sampler.

(5) The method according to any one of features (1)-(4), in which the down-sampling module uses a down-sampling ratio, N, that is fixed and known in both an encoder and a decoder, or is user-defined.

(6) The method according to any one of features (1)-(5), in which the up-sampling module is one of a classical image up-sampler and a learning-based image up-sampler.

(7) The method according to any one of features (1)-(6), in which the up-sampled compressed input is subtracted from the input to generate a second residual signal, and wherein the second residual signal is provided to the learning-based codec.

(8) The method according to feature (7), in which the output of the second codec is added on top of the up-sampled compressed input to form the reconstructed video suitable for machine vision tasks.

(9) The method according to any one of features (1)-(8), in which the input to the hybrid codec is the ground-truth.

(10) The method according to any one of features (1)-(9), in which the machine vision network is fixed and parameters for a residual coder, entropy coder, and entropy model of the second codec are trained.

(11) An apparatus for encoding video for machine vision and human/machine hybrid vision, including: at least one memory configured to store computer program code; at least one processor configured to access the computer program code and operate as instructed by the computer program code, the computer program code including: setting code configured to cause the at least one processor to receive at a hybrid codec, input including at least one of video or image data, the hybrid codec including a first and second codec, wherein the first codec is a traditional codec designed for human consumption and the second codec is a learning-based codec designed for machine vision; compressing code configured to cause the at least one processor to compress the input using the first codec, wherein the compressing code includes down-sampling code configured to cause the at least one processor to down-sample the input using a down-sampling module, and the compressing code includes up-sampling code configured to cause the at least one processor to up-sample the compressed input using an up-sampling module producing a residual signal; quantizing code configured to cause the at least one processor to quantize the residual signal to obtain a quantized representation of the input; entropy encoding code configured to cause the at least one processor to encode the quantized representation of the input using one or more convolutional filter modules; and training code configured to cause the one or more networks using the entropy encoded quantized representation.

(12) The apparatus of feature (11), in which the traditional codec comprises at least one of a VVC codec, HEVC codec, H264 codec, JPEG codec, or JPEG2000 codec.

(13) The apparatus according to feature (11) or (12), in which the learning codec comprises an image codec, and wherein the residual signal is compressed frame by frame without consideration of the temporal redundancy.

(14) The apparatus according to features (11)-(13), in which The apparatus according to claim 11, wherein the down-sampling module is one of a classical image down-sampler and a learning-based image down-sampler.

(15) The apparatus according to any one of features (11)-(14), in which the down-sampling module uses a down-sampling ratio, N, that is fixed and known in both an encoder and a decoder, or is user-defined.

(16) The apparatus according to any one of features (11)-(15), in which the up-sampling module is one of a classical image up-sampler and a learning-based image up-sampler.

(17) The apparatus according to any one of features (11)-(16), in which the up-sampled compressed input is subtracted from the input to generate a second residual signal, and wherein the second residual signal is provided to the learning-based codec.

(18) The apparatus according to feature (17), in which the output of the second codec is added on top of the up-sampled compressed input to form the reconstructed video configured for machine vision tasks.

(19) The apparatus according to any one of features (11)-(18), in which the input to the hybrid codec is the ground-truth.

(20) A non-transitory computer readable medium having instructions stored therein, which when executed by a processor cause the processor to execute a method for encoding video for machine vision and human/machine hybrid vision, the method including: receiving at a hybrid codec, input including at least one of video or image data, the hybrid codec including a first and second codec, wherein the first codec is a traditional codec designed for human consumption and the second codec is a learning-based codec designed for machine vision; compressing the input using the first codec, wherein the compressing includes down-sampling the input using a down-sampling module and up-sampling the compressed input using an up-sampling module producing a residual signal; quantizing the residual signal to obtain a quantized representation of the input; entropy encoding the quantized representation of the input using one or more convolutional filter modules; and training one or more networks using the entropy encoded quantized representation.

What is claimed is:

1. A method for encoding video for machine vision and human/machine hybrid vision, the method being executed by one or more processors, the method comprising:
  receiving, at a hybrid codec, an input including at least one of video or image data, the hybrid codec including a first codec and a second codec, wherein the first codec is a traditional codec designed for human consumption and the second codec is a learning-based codec designed for machine vision;
  compressing the input using the first codec, wherein the compressing includes down-sampling the input using a down-sampling module and up-sampling the compressed input using an up-sampling module producing a residual signal;
  quantizing the residual signal to obtain a quantized representation of the input;
  entropy encoding the quantized representation of the input using one or more convolutional filter modules; and
  training one or more networks using the entropy encoded quantized representation,
  wherein the up-sampled compressed input is subtracted from the input to generate a second residual signal,
  wherein the second residual signal is provided to the learning-based codec,
  wherein the output of the second codec is added on top of the up-sampled compressed input to form the reconstructed video for machine vision tasks, and
  wherein training the one or more networks using the entropy encoded quantized representation comprises determining a value of an index specifying which of the machine vision tasks is targeted by the training.

2. The method of claim 1, wherein the traditional codec comprises any of a VVC, HEVC, H264, JPEG, or JPEG2000 codec.

3. The method of claim 1, wherein the learning codec comprises an image codec, and wherein the residual signal is compressed frame by frame without consideration of the temporal redundancy.

4. The method of claim 1, wherein the down-sampling module is one of a classical image down-sampler and a learning-based image down-sampler.

5. The method of claim 4, wherein the down-sampling module uses a down-sampling ratio, N, that is fixed and known in both an encoder and a decoder, or is user-defined.

6. The method of claim 1, wherein the up-sampling module is one of a classical image up-sampler and a learning-based image up-sampler.

7. The method of claim 1, wherein the input to the hybrid codec is the ground-truth.

8. The method of claim 1, wherein parameters for a residual coder, entropy coder, and entropy model of the second codec are trained.

9. An apparatus for encoding video for machine vision and human/machine hybrid vision, the apparatus comprising:
  at least one memory configured to store computer program code;
  at least one processor configured to access the computer program code and operate as instructed by the computer program code, the computer program code including:
    setting code configured to cause the at least one processor to receive, at a hybrid codec, an input including at least one of video or image data, the hybrid codec including a first codec and a second codec, wherein the first codec is a traditional codec designed for human consumption and the second codec is a learning-based codec designed for machine vision;
    compressing code configured to cause the at least one processor to compress the input using the first codec, wherein the compressing code includes down-sampling code configured to cause the at least one processor to down-sample the input using a down-sampling module, and the compressing code includes up-sampling code configured to cause the at least one processor to up-sample the compressed input using an up-sampling module producing a residual signal;
    quantizing code configured to cause the at least one processor to quantize the residual signal to obtain a quantized representation of the input;
    entropy encoding code configured to cause the at least one processor to encode the quantized representation of the input using one or more convolutional filter modules; and
    training code configured to cause the one or more networks using the entropy encoded quantized representation,
  wherein the up-sampled compressed input is subtracted from the input to generate a second residual signal,
  wherein the second residual signal is provided to the learning-based codec,
  wherein the output of the second codec is added on top of the up-sampled compressed input to form the reconstructed video for machine vision tasks, and
  wherein training the one or more networks using the entropy encoded quantized representation comprises determining a value of an index specifying which of the machine vision tasks is targeted by the training.

10. The apparatus according to claim 9, wherein the traditional codec comprises at least one of a VVC codec, HEVC codec, H264 codec, JPEG codec, or JPEG2000 codec.

11. The apparatus according to claim 9, wherein the learning codec comprises an image codec, and wherein the residual signal is compressed frame by frame without consideration of the temporal redundancy.

12. The apparatus according to claim 9, wherein the down-sampling module is one of a classical image down-sampler and a learning-based image down-sampler.

13. The apparatus according to claim 12, wherein the down-sampling module uses a down-sampling ratio, N, that is fixed and known in both an encoder and a decoder, or is user-defined.

14. The apparatus according to claim 9, wherein the up-sampling module is one of a classical image up-sampler and a learning-based image up-sampler.

15. The apparatus according to claim 9, wherein the input to the hybrid codec is the ground-truth.

16. A non-transitory computer readable medium having stored thereon computer instructions that when executed by at least one processor cause the at least one processor to:

receive, at a hybrid codec, an input including at least one of video or image data, the hybrid codec including a first codec and a second codec, wherein the first codec is a traditional codec designed for human consumption and the second codec is a learning-based codec designed for machine vision;

compress the input using the first codec, wherein the compressing includes down-sampling the input using a down-sampling module and up-sampling the compressed input using an up-sampling module producing a residual signal;

quantize the residual signal to obtain a quantized representation of the input;

entropy encode the quantized representation of the input using one or more convolutional filter modules; and train one or more networks using the entropy encoded quantized representation, wherein the up-sampled compressed input is subtracted from the input to generate a second residual signal, wherein the second residual signal is provided to the learning-based codec, wherein the output of the second codec is added on top of the up-sampled compressed input to form the reconstructed video for machine vision tasks, and wherein training the one or more networks using the entropy encoded quantized representation comprises determining a value of an index specifying which of the machine vision tasks is targeted by the training.

* * * * *